United States Patent [19]
Sündermann

[11] Patent Number: 5,125,497
[45] Date of Patent: Jun. 30, 1992

[54] LIFTING SYSTEM FOR LIFTING GOODS OVER A LIMITED DISTANCE WHILE MAINTAINING AN ALIGNED ORIENTATION OF THE GOODS WITH RESPECT TO A REFERENCE

[75] Inventor: Heinz Sündermann, Osterburken-Bofsheim, Fed. Rep. of Germany

[73] Assignee: Bleichert Forderanlagen GmbH, Osterburken, Fed. Rep. of Germany

[21] Appl. No.: 564,152

[22] Filed: Aug. 7, 1990

[30] Foreign Application Priority Data

Dec. 28, 1989 [EP] European Pat. Off. ............ 89124057

[51] Int. Cl.⁵ .............................................. B65G 47/34
[52] U.S. Cl. .............................. 198/463.3; 198/774.1; 198/774.3; 198/809
[58] Field of Search ............... 198/463.1, 463.2, 463.3, 198/372, 809, 774.1, 774.3, 369

[56] References Cited

U.S. PATENT DOCUMENTS

| | | | |
|---|---|---|---|
| 2,497,768 | 2/1950 | Hallead | 198/774.1 |
| 2,856,055 | 10/1958 | Mars et al. | 198/463.3 X |
| 3,194,380 | 7/1965 | Watson | 198/463.3 X |
| 3,324,992 | 6/1967 | Margan | 198/774.3 |
| 3,462,004 | 8/1969 | Hill | 198/774.3 |
| 3,854,576 | 12/1974 | Bowman | 198/809 X |
| 4,016,969 | 4/1977 | Brand | |
| 4,878,578 | 11/1989 | Brouwer | 198/809 |

FOREIGN PATENT DOCUMENTS

| | | |
|---|---|---|
| 1850377 | 2/1962 | Fed. Rep. of Germany. |
| 2139842 | 2/1973 | Fed. Rep. of Germany. |
| 2632505 | 1/1977 | Fed. Rep. of Germany. |
| 2126556A | 3/1984 | United Kingdom. |

Primary Examiner—Joseph E. Valenza
Assistant Examiner—Tuan N. Nguyen
Attorney, Agent, or Firm—Frishauf, Holtz, Goodman & Woodward

[57] ABSTRACT

To provide for precise vertical movement without guide elements of a lifting frame, a main shaft (21) has a plurality of cam disks, such as eccenters (26) located thereon, which are coupled to the lifting frame, directly, or by means of double-arm levers. The eccenters may be placed 180° offset from each other on the shaft, with one eccenter follower or cam follower (27) secured to the frame at a first longitudinal position, and other eccenters or cam followers (27) coupled to double-arm levers (33), pivotable about a fixed pivot axis (36) and having the remote ends coupled to the lifting frame (8) at a position remote from the first attachment position. Synchronous movement of the connections to the lifting frame (8) is ensured by using only one drive shaft, so the movement can be, precisely, up and down, while maintaining the frame horizontal.

13 Claims, 4 Drawing Sheets

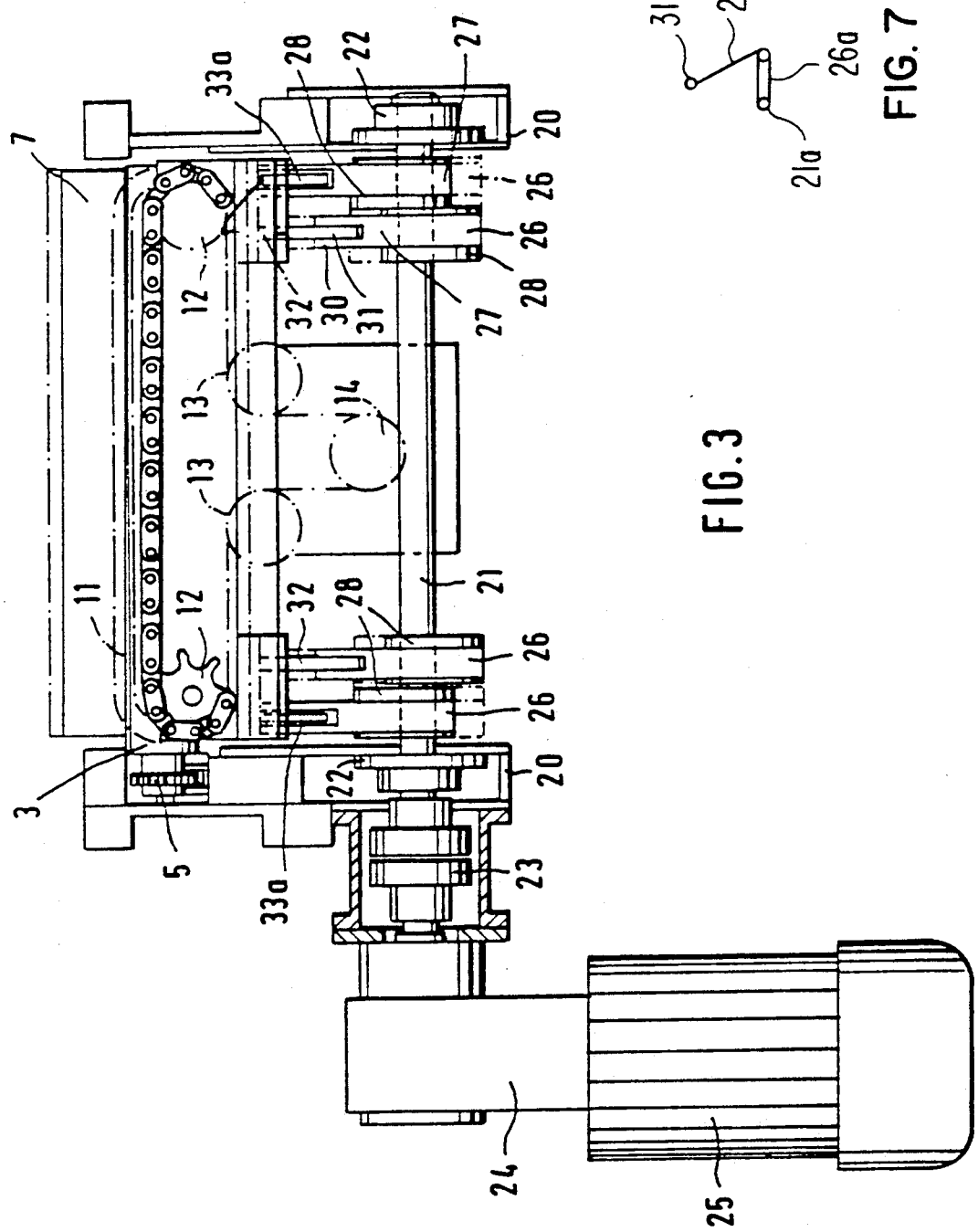
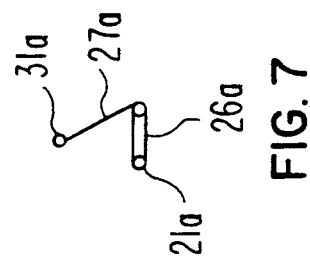
FIG. 7
FIG. 3

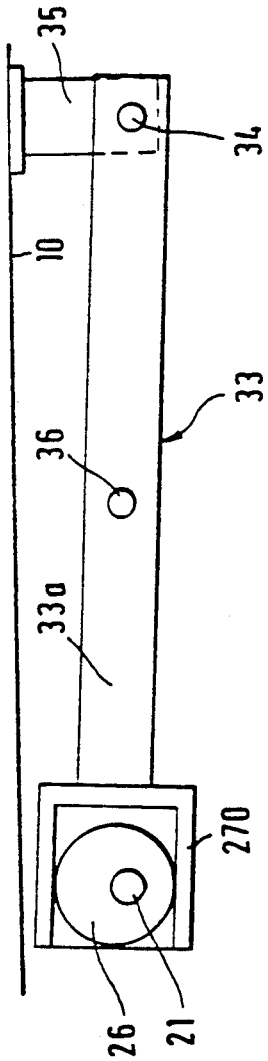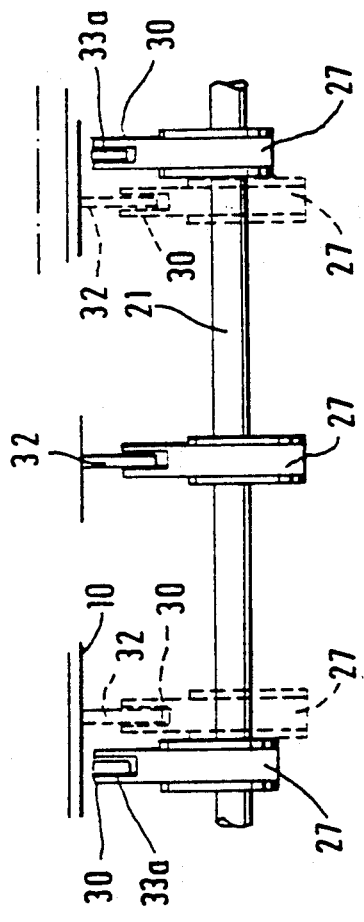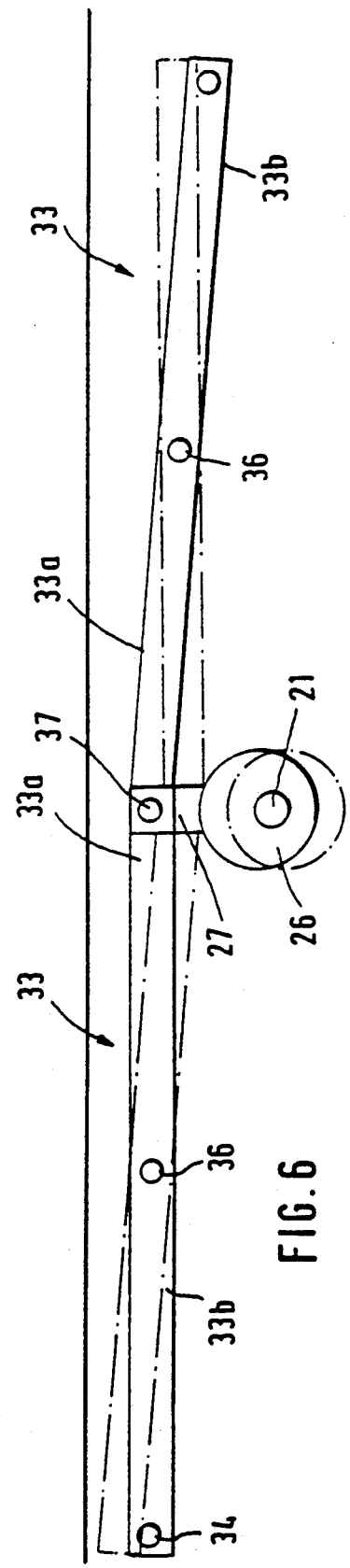

LIFTING SYSTEM FOR LIFTING GOODS OVER A LIMITED DISTANCE WHILE MAINTAINING AN ALIGNED ORIENTATION OF THE GOODS WITH RESPECT TO A REFERENCE

FIELD OF THE INVENTION

The present invention relates to a lifting system to lift goods, and especially to such a system adapted for association with transport conveyors, to shift goods from a delivery conveyor to a receiving conveyor at a different level from the level of the delivery conveyor, while maintaining alignment of the goods with respect to a reference, which, for example, may be a horizontal plane, that is, perpendicular to the force of gravity.

BACKGROUND

Lifting systems for association with various types of conveyors, for example roller conveyors, are often used to raise goods. These systems are so arranged that they receive goods from the rollers of the receiving conveyor, raise them on a higher level of the delivery conveyor for transfer to the delivery conveyor, typically at right angles to the receiving conveyor. Such systems usually have a base frame and a raising element which can be shifted with respect to the base frame. A drive source is provided which is coupled to rotatable lifting elements which, for example, are a lever arrangement, and are coupled to the raising frame. The lifting system, thus, permits removal of goods from a receiving conveyor and transfer to the delivery conveyor at another level.

Usually, the lifting system has a raising element which, often, is in the form of a frame which is coupled to an intermediate element. The intermediate element, in turn, receives a short-stroke vertical raising movement, when driven by a suitable drive motor. One such lifting system uses a raising drive with rotating eccentric rollers which, always in pairs, are located, spaced next to each other, on parallel shafts which are rotatably journalled in the base frame. The raising elements, formed as U-shaped raising levers, are located in pairs at two opposite sides of the raising frame. The horizontal alignment of this arrangement, that is, the maintenance of a horizontal plane of the raising frame, must be reliably ensured and, to do so, it is necessary that the four raising rollers operate in precise synchronism. In one such structure, the shafts which carry the eccentric rollers are coupled via two gear drives, which may be angular drives, to a third shaft so that they are synchronized with respect to each other and form a continuous complete drive chain. This construction is complex, heavy, and requires, further, vertical slide or guide ways and shoes sliding thereon for vertical guidance of the lifting frame.

Another type of raising system also uses four eccentric rollers which are, in pairs, on two parallel shafts rotatably journalled in the frame. The two shafts are coupled via a sprocket chain or gear belt drive. The drive motor is coupled via a sprocket chain or gear belt to one of the two shafts. Sprocket chains or gear belts do not operate without play, and thus the raising system does not run smoothly, particularly in those portions of the raising or lowering cycle in which there is a reversal of direction of movement of the frame, that is, at the upper and lower terminal or end position.

Rather than using the center rollers, crank systems and crank disks or wheels have also been used as raising elements, the crank disks or wheels being located outwardly of the mechanical structure.

Another type of raising system uses four dual lever arrangements rather than rotating lifting arrangements such as eccenter rollers or cranks. Knee links are pivotably connected to the raising frame, and driven by a pneumatic or hydraulic raising cylinder. This construction also is complex and, for synchronous operation, requires careful and time-consuming adjustment and equalization.

THE INVENTION

It is an object to provide a raising system and raising apparatus which is simple, highly reliable, runs smoothly, and is not subject to play.

Briefly, a common shaft is provided, driven by a suitable motor, and rotatably journalled in a base frame. A cam arrangement is mounted on this common shaft to be rotated thereby for example formed by eccenter rollers, the cam being engaged by cam followers. A lever system, having a fixed fulcrum, is secured to the base frame, pivotable about a fixed fulcrum axis, the lever system having a first lever arm coupled to one of the cam followers, and a second lever arm movably coupled to the lifting frame at a first lifting position and supporting the lifting frame at that first lifting position. Coupling means are then provided to couple another one of the cam followers to the lifting frame at a second lifting position, remote from the first lifting position, and supporting the lifting frame at a second spaced lifting position.

Upon rotation of the motor, and hence of the common shaft, the cam followers will carry out synchronized movement to shift the level of the lifting frame while retaining the orientation thereof with respect to a reference, for example a horizontal plane perpendicular to the force of gravity.

The lifting system has the advantage that it requires only a single shaft so that, with simple cams placed thereon, precise synchronization of the levers coupled to different lifting positions on the lifting or raising frame is obtained. Additional gearing, and particularly bevel gearing or angled gearing is not needed. The construction, thus, is extremely simple, provides smooth raising and, in operation, is not subject to play.

The common shaft preferably is secured to outer bearings on the base frame, so that it is easily assembled. The cam elements preferably are eccentric disks or eccenter rollers; the shaft, however, could also be formed as a crankshaft in which the cranks are the equivalent of cam elements to form the raising parts of the system.

DRAWINGS

FIG. 3 is an end view of the system of FIG. 1 taken in the transport direction of the receiving conveyor;

FIG. 4 is a fragmentary side view of an eccentric roller with an associated double-arm lever as illustrated in FIG. 1, and further showing a modification;

FIG. 5 is a fragmentary side view, to a different scale, of yet another raising arrangement for the lifting system;

FIG. 6 is a side view, to another scale, of still another raising arrangement; and FIG. 7 is a highly schematic representation of another embodiment of the invention, in which the synchronized movement obtained from the common shaft 21 is obtained by a crank rod and the cams are formed by the eccentric position of a crank arm.

DETAILED DESCRIPTION

Figure 1:
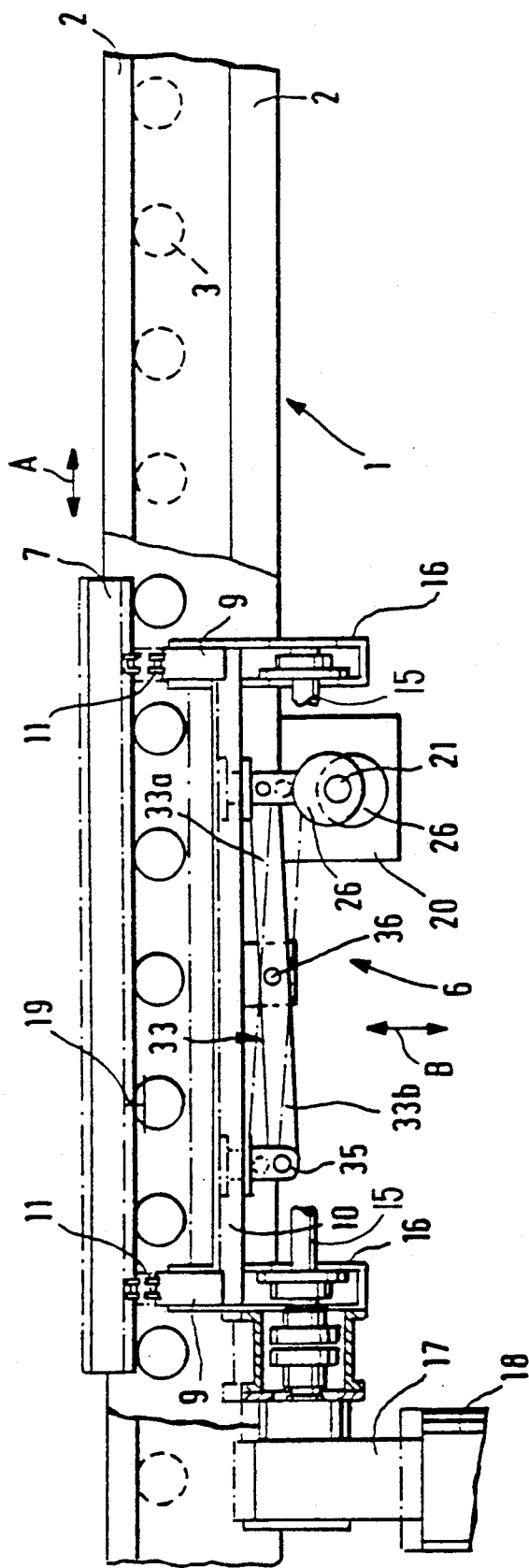
FIG. 1 is a highly schematic side view, broken away in part, showing a lifting or raising system in accordance with the invention to transfer goods from a receiving conveyor.
Figure 2:
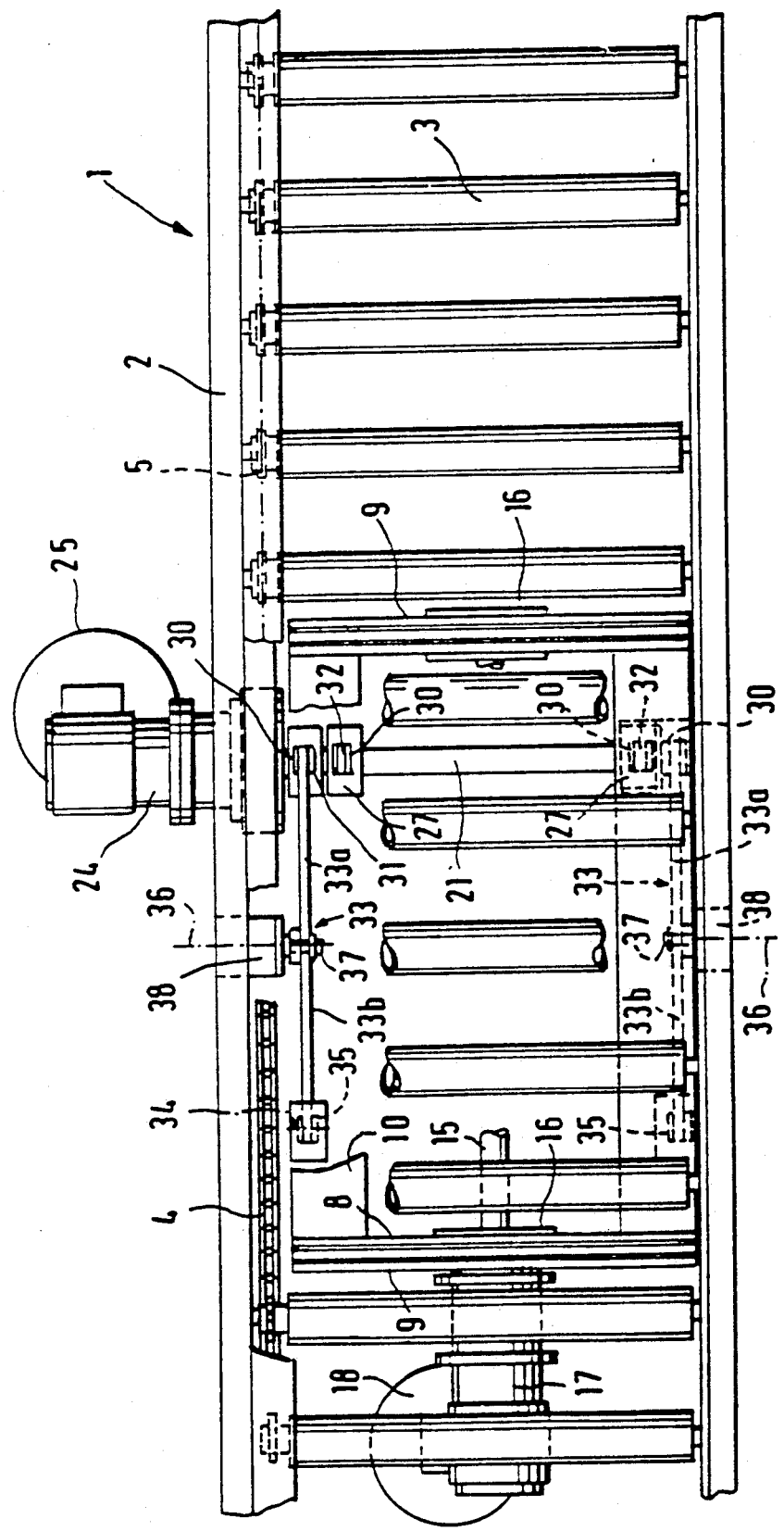
FIG. 2 is a top view of the arrangement of FIG. 1, with parts broken away.

A delivery conveyor delivers goods to the raising or lifting system in accordance with the present invention. The delivery conveyor, for example, and as best seen in FIGS. 1 and 2, has a fixed frame 1 with parallel side elements 2 on which cylindrical transport rollers 3 are rotatably journalled. The transport rollers 3 are coupled by an endless chain running over sprocket wheels 5. The run 4 of the chain operates in the transport direction shown by arrow A. The roller conveyor is interrupted by a lifting system or raising system 6 which permits raising of goods off the rollers 3 of the roller conveyors and place it on another conveyor, not shown, and operating at right angles to the transport direction A. Of course, the operation can be reversed, so that, in general, the system of the present invention is intended to shift goods between a delivery conveyor delivering the goods thereto and a receiving conveyor at a different level receiving the delivered goods 7.

The raising or lifting system 6 has an essentially rectangular raising or lifting frame 8 (FIG. 2). It has two parallel frame legs 9 which are located, as seen in FIGS. 1 and 2, between adjacent transport rollers 3 of the roller conveyor. The frame legs 9 are coupled by two parallel spaced longitudinal frame legs 10 (FIG. 1) located beneath the transport rollers 3. The raising frame 8 supports a chain conveyor having two transport chains 11, typically including transport dogs. The upper runs of the transport chains 11 are guided in parallel to the frame legs 9 at the upper side thereof. Suitable deflection and turn-around rollers 12, 13 (FIG. 3) are located on the frame 8. Two sprocket chain wheels 14, coupled to a common drive shaft 15, drive the transport chains 11, see FIGS. 1 and 2. The common shaft 15 is journalled or bearing boxes 16 secured to the bottom of the frame 8. The shaft 15 is driven via a gearing 17 from a drive motor 18 (FIG. 1).

The lifting frame 8 is horizontally positioned. It can move up and down through a short stroke, as shown by arrow B (FIG. 1). The transport chains 11, then, are shifted from their full-line position shown in FIG. 1, in which the chains and the carrier dogs are beneath the upper edge of the transport rollers 3, into a raised position, which is shown in chain-dotted lines in FIG. 1. In the raised position of the frame 8, goods 7 received by the raising system by the receiving conveyor are lifted off the transport rollers 3 so that the carrier dogs, not specifically shown in the drawings, on the transport chains 11 can move the goods at right angles to the transport direction A of the receiving conveyor, for example towards a delivery conveyor.

The required short vertical stroke which, in FIG. 1, is illustrated by the dimension 19, is transmitted to the lifting frame 8 by a lifting drive. A first embodiment of the lifting drive is shown in FIGS. 1-3.

In accordance with a feature of the invention, two bearing boxes 20 are secured to the frame elements 2 beneath the raising frame 8, in which a common shaft 21, positioned transversely to the transport direction A, is rotatably retained in suitable bearings 22. The bearings 22—see FIG. 3—are located outwardly of the frame 2. An engageable-disengageable clutch 23 and a gear 24 couple the common shaft 21 to a drive motor 25. The shaft 21 extends parallel to the transverse legs 9 of the frame 2 and is positioned close to one of them, as best seen in FIGS. 1 and 2 close to the receiving position of the receiving conveyor rollers 3. Four cam elements 26, preferably, and as shown, four eccenter rollers 26, are spline-connected to the common shaft 21, to form four raising elements. As best seen in FIG. 3, the four eccenter rollers 26 are located, in pairs, close to the longitudinal frame legs 10 of the frame 8. The eccentric position of the eccenter rollers 26, or of the equivalent crank eccentric positions of each of the pairs 26, are offset 180° with respect to each other and, so offset, secured to the shaft 21. A cam follower 27, in form of a U-shaped fork 27 is in engagement with each one of the cams 26. The cam follower 27 is laterally guided by flanges 28.

The cam followers 27 of the inner eccenter rollers 26 are coupled via the forked elements 30 and pivot bolts 31 to brackets 32 which are welded, close to the cross leg 9 of the right, with respect to FIG. 2, to the longitudinal legs 10 of the frame 8, and are thus coupled to the frame 8 to support it thereby.

The cam followers 27 of the two outer eccenter rollers 26 have their forked portions coupled via a pivot bolt 31 to one end of an arm 33a of a double-arm lever 33. The other arm 33b is coupled via a horizontal pivot bolt 34, see FIG. 2, with a support element 35 which is welded to the longitudinal frame legs 10 adjacent the left transverse frame leg 9, by being welded to the bottom of the respective frame leg 10, so that the lever arm extends close to the left, with reference to FIG. 2, portion of the frame 8.

The two double-arm levers 33 which are positioned in the transport direction A are pivotable about a fixed essentially horizontal pivot axis 36 (FIG. 2). A bearing bolt 37, coaxial with the pivot axis 36, permits pivoting of the respective double-arm lever 33. The bearing bolt 37 is secured via bearing boxes or blocks 38 to the frame.

In some arrangements, the shaft 21, and hence the entire raising system, could be placed rotated by 90° with respect to that shown in the drawings. The chain conveyor would retain its orientation as illustrated in FIGS. 1 and 3.

The lifting frame 8, thus, is stably supported adjacent the corners of the frame 8, by being supported by its frame legs 9 and 10. Independently of its lifting position, it precisely retains its horizontal alignment, or any other alignment previously designed therefor, or determined, for example, by the position of the base frame 2.

Operation

Upon rotation of shaft 21, the cams or four eccenter rollers 26, guide the cam followers 27 to execute a synchronous movement of the same amount. The two inner eccenter rollers 26 transfer this movement directly to the frame 8; the outer eccenter rollers, which are offset by 180° with respect to the two inner rollers, respectively, transfer the movement via the two double-arm levers 33 on the frame 8. This movement is free from play. By suitable dimensioning of the shaft 21 and of the double-arm levers 33, the system 6 can be designed for any length, width or loading of the frame 8. The height or the stroke 19 is controlled by suitable choice of the eccenter rollers 26 in accordance with the particular requirements of the receiving and delivery conveyors, respectively.

The arrangement in which the inner eccenter rollers are directly coupled to the frame 8 and the outer ones via the double-arm levers 33 is simple and preferred since it permits easy mounting and assembly of the respective coupling elements, namely the brackets 32 on the frame 8 and the bearing boxes 38 for the pivot axis 36 on the frame 2. The arrangement may be reversed, however, and the outer eccenter rollers 26 could be coupled directly to the frame 8, wherein the inner eccenter rollers 26 act on the frame 8 via the double-arm lever 33.

Modification in accordance with FIG. 4

In the embodiment described in FIGS. 1-3, the two outer eccenter rollers 26 are coupled to the cam followers 27 which, in turn, are pivotably connected to the respective lever arms 33a of the lever 33. As seen in FIG. 4, however, an alternative arrangement may be made in which the cam followers 270 are securely and rigidly connected to the respective lever arm 33a and the cam follower 270 is then constructed in form of a fork element or a claw or U-surround follower which, in part, engages over and around the eccenter roller 26. This arrangement has the advantage of additional simplification of manufacture and assembly.

Modification, embodiment of FIG. 5

For some applications and in some arrangements it is only necessary to support the lifting frame 8 on three support points. In such cases, the arrangement as seen in FIG. 5 may be used. The two external or outside eccenter rollers 26 are coupled over a respective double-arm lever 33 with the lifting frame 8, using either the embodiment of FIGS. 1-3 or of FIG. 4. The two inner eccenter rollers 26 of FIG. 2 are not used; rather, only a single eccenter roller 26 is used, located halfway between the outer eccenter rollers, coupled to its cam follower 27 which is then linked by the pivot joint 30 to a centrally placed bracket 32 secured to the cross leg 9 of the raising frame 8.

The arrangement can be reversed in that the central eccenter roller 26 is coupled over a double-arm lever 33 to the raising frame 8, whereas the two outer eccenter rollers 26 are connected, via the cam follower 27, directly with the brackets 32 on the frame 8. The pivot shaft 37, then, would have to extend transversely across the frame 8.

Embodiment of FIG. 6

The eccenter rollers 26 can be located to have their eccentricity in alignment, that is, the eccenter rollers 26 of both pairs have the same eccentricity point, not offset 180° as in the embodiment of FIGS. 1-5. The cam followers 27, in which FIG. 6 shows only one of them, are coupled by a pivot joint 27 with four lever arms 33a of four double-arm levers 33, which pivot about fixed pivot axes 36 at both sides of the eccenter roller 26. The four lever arms 33b extending from the arms 33a are linked at their ends to the longitudinal frame legs 10, as illustrated in FIG. 2. The common shaft 21 is located midway of the longitudinal legs 10 of the frame 8.

The link connection 34, see FIG. 6, at the end of the respective lever arms 34, must have a pivoting axis which permits limited lateral movement. This, for example, can be obtained by forming the opening at the pivot 34 as an elongated or oval hole. This elongated oval hole can be provided for each one of the pivots 34. This can be avoided, however, by slightly offsetting one of the arms, as seen in FIG. 6 the right one, downwardly with respect to the other one, in FIG. 6 the left one. This causes the lifting frame 8, upon lifting movement, to carry out a slight longitudinal movement in, or against the transport direction A. This is too small, however, to be of significance and, usually, can be neglected.

In the described example, the lifting frame 8 is supported on its lifting drive, that is, by the arms, brackets and links at four or three support positions. It is, thereby, reliably retained in position, without danger of tipping. The lateral guidance of the cam followers 27 on the eccenter rollers 26 as well as of the fork elements 30, the brackets 32, levers 33 and their lateral guidance at pivots 34 additionally ensure positive lateral guidance of the frame 8. Further or additional lateral guide elements, such as guide rails and the like, are not necessary.

In the embodiment of FIG. 6 it would be possible to use only two eccenter rollers 26. The cam follower 27 of each one of the two eccenter rollers 26 then must be coupled at the pivot 37 with the lever arms 33a of two double-arm levers 33, which have, each, fixed parallel pivot axes 36 at both sides of the common shaft 21. At least the ends of two lever arms 33a or 33b must have a pivot connection which permits lateral limited movement, for example by use of an elongated pivot hole or the like.

The double-arm levers 33 can be rigidly coupled to the associated cam follower, for example by using a surrounding cam follower element 270 (FIG. 4). Other arrangements are possible, for example in which one lever arm of the double-arm lever is link-connected, by a pivot connection, with the associated cam follower. That cam follower, also, may be a fork-element, similar to that shown in FIG. 4.

The cam followers and/or the lever arms 33 can be coupled to the respective links or brackets to the frame 8 so that they provide for lateral guidance. A bracket-pivot bolt connection is suitable. Thus, separate vertical guidance with respect to the base frame 2 is not necessary.

The cams and cam followers, preferably, are eccenter disks or eccentric wheels or rollers, against which the cam follower elements can readily engage, or be coupled therewith. As described in connection with FIGS. 1-3, eccenter disks or wheels are used which are offset 180° with respect to each other, and placed on a common shaft. Pivot link connections are used to couple the cam followers with a bracket 32 attached to the frame 8 and, respectively, the double-arm lever 33 to the bracket 35 on the frame 8. In another embodiment, the cam follower, connected to two double-arm levers is so arranged that the fixed pivot axes of the double-arm levers are placed at both sides of the common shaft, see FIG. 6. Using four aligned eccenters would require a pivot connection of all four double-arm levers which is so arranged that some lateral movement of the pivot axis with respect to the lifted element, that is, the frame and/or the cam follower, is possible. Such arrangement can be avoided by offsetting the pivot axes of at least two of the double-armed levers in the direction of lifting/lowering movement with respect to each other, so that the lever arms of the respective levers at the points of the engagement with the lifting frame need not carry out a lateral movement. This, however, slightly shifts the entire frame 2 to-and-fro as it moves which, usually, is such a small movement that for all practical purposes it can be neglected.

Depending on the width of the raising frame and the design of the entire system, it would be possible to have only two support points which are coupled to one raising element, and to be supported thereby, that is, only two points which are coupled, via one or more double-arm levers to the cams which are secured to the common shaft. To avoid any possibility of tipping, however, and particularly with frames which are somewhat wider or may have to handle unbalanced goods or loads, it is preferred to use three or four raising combinations, that is, cams, cam followers and associated linkages, which are preferably placed in pairs next to each other, so that the raising frame is supported at four spaced support positions. In narrower frames, and when unbalanced loads are not expected, it may be sufficient to have three raising element combinations, one of which has a double-arm lever as described, and the other two can be directly coupled to the respective cams and cam followers.

Various other changes and modifications may be made. The system is not limited to conveyors which require right-angle transfer of goods. Rather, the system can be used whenever it is necessary to carry out a short-stroke, but highly precise lifting movement of a lifting element. The conveyor chain 11, with the conveyor dogs (not shown) thereon, can be arranged in any suitable manner or direction. To mention a further example, the system can be used, for example, to lift indexing bolts or the like.

If the common shaft 21 is a crankshaft as shown schematically in FIG. 7, then the equivalent of the cam or eccenter is formed by the crank arm 26a, to which the crank rod 27a is coupled, to form the crank arm follower. The arm 27a is then pivoted at 31a, for example corresponding to the pivot 31 (FIG. 3).

Still various other changes and modifications may be made, and any features described herein may be used with any of the others, within the scope of the inventive concept.

I claim:

1. A lifting system for lifting goods (7) over a limited distance while maintaining aligned orientation with respect to a reference, particularly to shift goods between a receiving conveyor (2, 3, 4, 5) and a delivery conveyor, at a level different from the level of the receiving conveyor, said system having
a base frame (1, 2);
a lifting or raising frame (8) for receiving the goods (7) at a first level;
rotary motor means (25); and
comprising
means to couple the rotary motor means (25) to the lifting frame (8) and converting rotary movement thereof to linear movement, including
a common shaft (21) rotatably journalled in the base frame (1, 2) and driven by the rotary motor means (25);
at least two cam means (26, 26a) coupled to the common shaft (21) and rotating therewith, said at least two cam means being similar and offset 180° with respect to each other on said common shaft (21);
at least tow cam follower means (27, 270, 27a) in engagement with the cam means;
double-arm lever means (33) pivotable about a pivot axis (36) fixed on said base frame (1, 2) and defining a sized fulcrum (37, 38), said lever means having
a first lever arm (33a) coupled to one of said cam follower means (27, 270, 27a),
a second lever arm (33b) coupled to said lifting frame at a fist lifting position (35) and supporting said lifting frame at said first lifting position;
a pivot connection connecting the second lever arm to said lifting frame; and
coupling means (30, 31, 32) for coupling another one of said cam follower means (27, 270, 27a) to said lifting frame (8) at a second lifting position (32) remote from said first lifting position, and supporting said lifting frame at said second spaced lifting position,
whereby, upon rotation of said motor means (25) and hence said common shaft (21), said cam followers will carry out synchronized movement to shift the level of said lifting frame in said orientation, and hence goods on said lifting frame.

2. The system of claim 1, including bearing means (22) rotatably retaining said common shaft (21) in the base frame, said bearing means being located at the outer perimeter of said base frame (1, 2).

3. The system of claim 1, wherein said cam means (26) comprise eccentric disks or eccentric rollers.

4. The system of claim 1, wherein said cam means include eccentric means comprising a crank on said common shaft and said cam follower means comprise crank arms coupled at said crank.

5. The system of claim 1, wherein (FIG. 4) one lever arm (33a) of the double-arm lever (33) is rigidly coupled with the associated cam follower means (270).

6. The system of claim 1, wherein one lever arm (33a), of be double-arm lever (33) is pivotably coupled with the associated cam follower means (27).

7. The system of claim 1, wherein (FIG. 4) the cam follower means comprises a fork element (270) at least in part surrounding the cam means (26).

8. System of claim 1, further including lateral guide means (28) laterally guiding the respective cam follower means (27, 270) on the cam means (26).

9. The system of claim 1, wherein one of said cam follower means (27) coupled to one of said cam means (26) is linked to two first lever arms (33a) of two double-arm levers (33), said double-arm levers having fixed pivot axes (36) located at opposite sides on said common shaft (21);
and wherein the second lever arms (33b) of the two double-arm levers are pivoted, to the first and second lifting positions, respectively, on said raising or lifting frame (8).

10. The system of claim 1, wherein at least two similar cam means (26) are secured to said common shaft, with common orientation;
and wherein the cam follower means (27) are coupled to first lever arms (33a) of two double-arm levers (33), respectively, by a pivot connection, said double-arm levers having pivot axes (36) located at respectively opposite sides of said common shaft (21);
and wherein the pivot axes (36) of said two double-arm levers are offset with respect to each other in the direction of movement (B) of the lifting frame (8) upon shifting of the level thereof.

11. The system of claim 1, wherein four essentially similar cam means (26) are located on said common shaft, and two each of said cam means are positioned in pairs adjacent each other.

12. The system of claim 1, wherein three essentially similar cam means (26) are located on said common shaft (21), two of which are located adjacent lateral sides of the lifting frame and one essentially centrally thereof;

and wherein at least one cam follower (27) coupled to at least one of said double-arm levers is coupled to said lifting frame.

13. The system of claim 1, wherein said pivot axis (36) extends in an essentially horizontal direction.

* * * * *